Jan. 4, 1949.  L. C. RENFROE ET AL  2,458,200
ELECTRIC LAWN MOWER AND HEDGE CLIPPER
Filed May 3, 1946  2 Sheets-Sheet 1
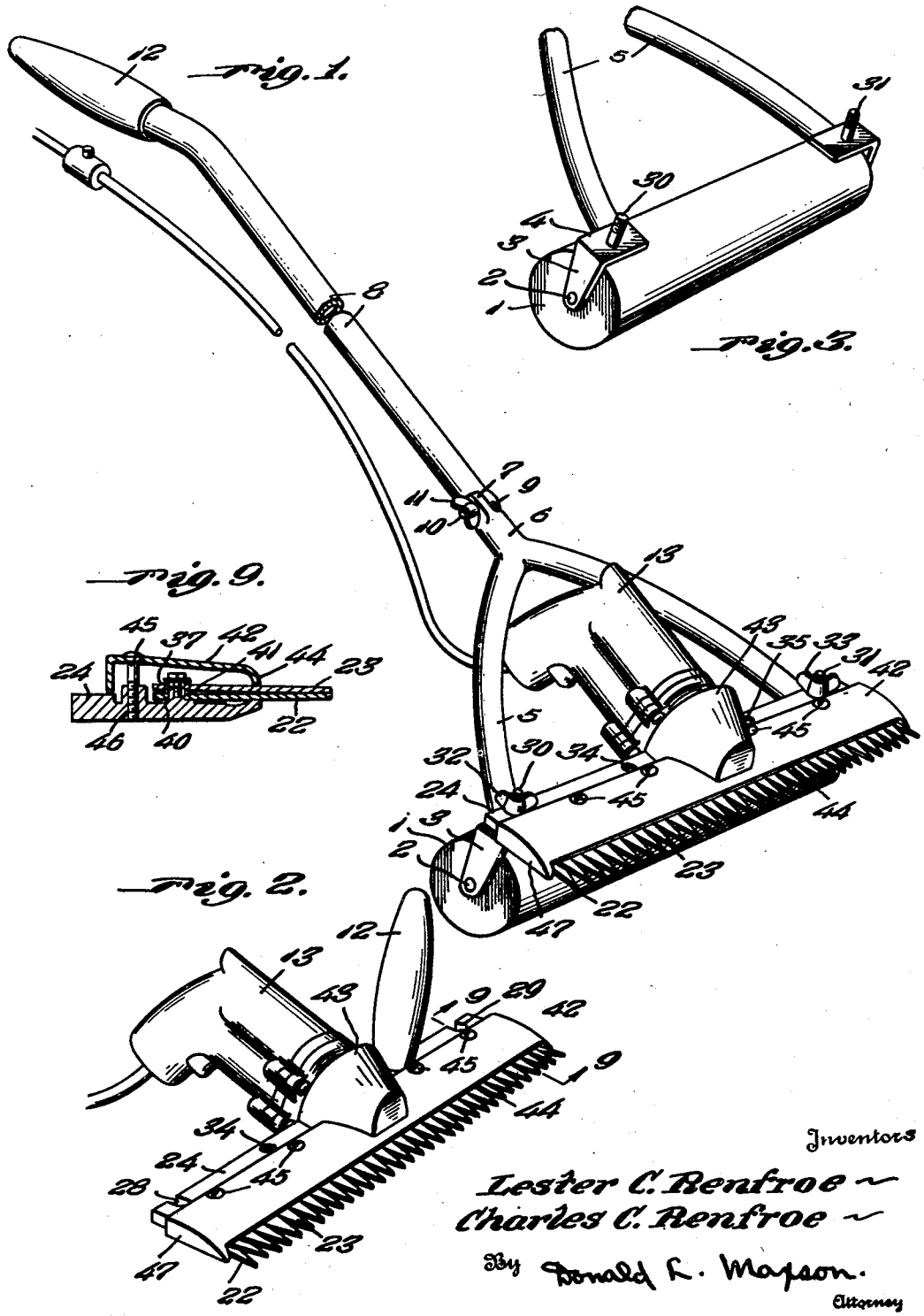
Inventors
Lester C. Renfroe
Charles C. Renfroe
By Donald R. Mapson
Attorney Jan. 4, 1949.　　　L. C. RENFROE ET AL　　　2,458,200
ELECTRIC LAWN MOWER AND HEDGE CLIPPER
Filed May 3, 1946　　　　　　　　　　　　2 Sheets-Sheet 2
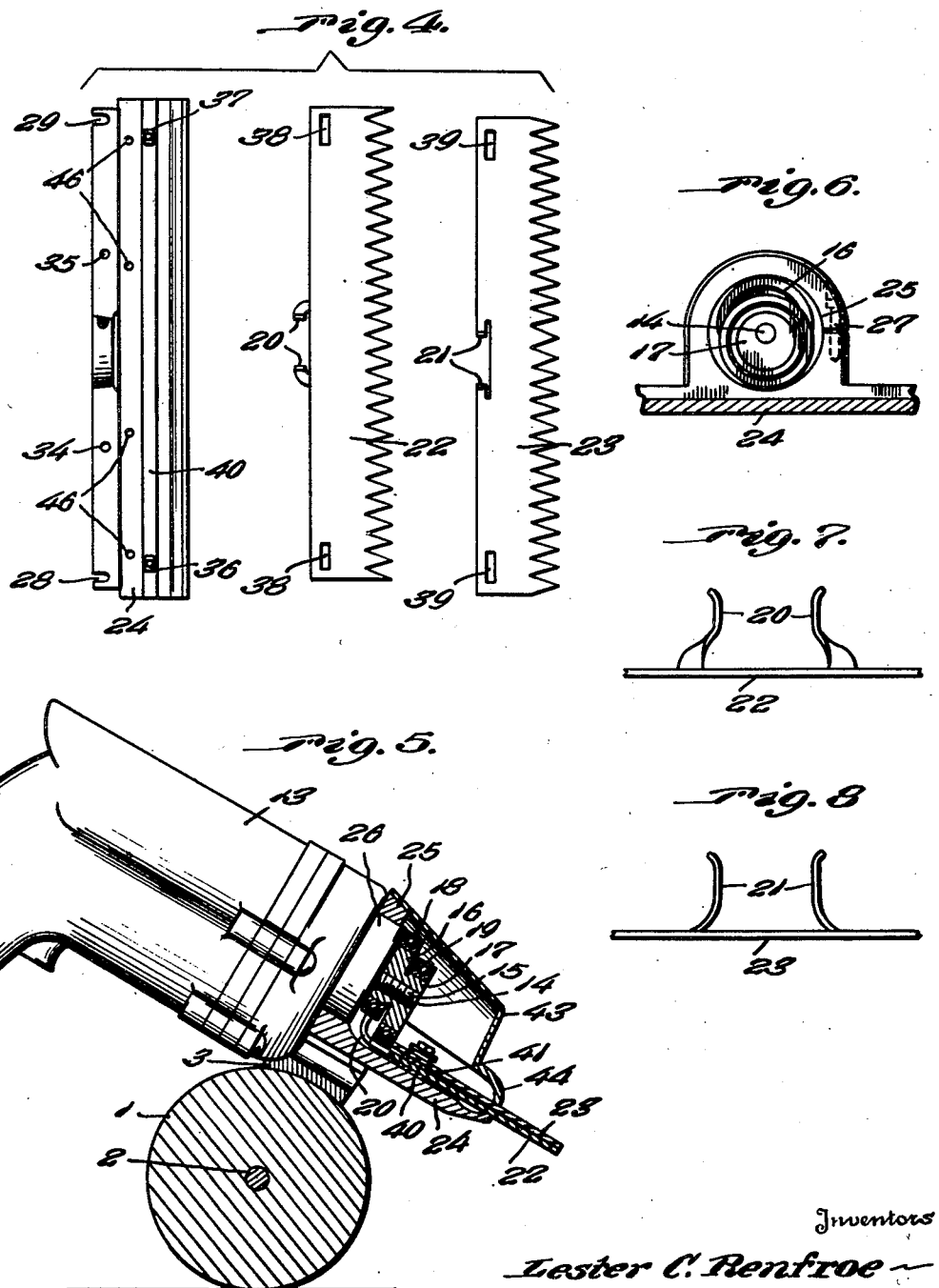
Inventors
Lester C. Renfroe
Charles C. Renfroe
By Donald L. Maxson
Attorney Patented Jan. 4, 1949

2,458,200

UNITED STATES PATENT OFFICE 2,458,200

ELECTRIC LAWN MOWER AND HEDGE CLIPPER

Lester C. Renfroe and Charles C. Renfroe, Jacksonville, Fla.

Application May 3, 1946, Serial No. 666,892

2 Claims. (Cl. 56—26.5)

1

This invention relates to improvements in electrically operated power lawn mowers.

An object of the invention is to provide an improved electrically operated power lawn mower which will utilize an electric drill motor for operating opposed action steel cutter blades.

Another object of the invention is to provide an improved combination electrically powered lawn mower and hedge and foliage clipper, which will be supported upon a roller when used as a lawn mower, and will be so constructed that the electric drill motor and cutter mechanism may be detached from the roller, and the removable handle on the upper end of the mower handle bar placed on the cutter mechanism to use the same for cutting hedge and foliage.

A further object of the invention is to provide an improved electrically operated power lawn mower which will employ a double acting sealed ball bearing cam for acting directly upon the hardened steel cutter blades to provide an opposed action which will practically eliminate vibration and loss of power.

Another object of the invention is to provide an improved electrically powered lawn mower and hedge clipper unit, which will be supported upon a roller when used as a lawn mower, and the cutter mechanism with electric motor detached from said roller by loosening two wing nuts so that the same may be used as a portable hedge clipper and foliage trimmer.

Another object of the invention is to provide a combined electric drill motor operated power lawn mower and hedge clipper which will be highly efficient in operation, and relatively inexpensive to manufacture and produce.

Other objects will appear as the description proceeds.

In the accompanying drawings which form a part of this application,

Figure 1 is a perspective view of the improved combined electrically operated power lawn mower and hedge clipper;

Figure 2 is a perspective view of the electrically operated hedge clipper when removed from the roller upon which it is mounted when used as a lawn mower;

Figure 3 is a perspective view of the roller with handle brackets supported thereon;

Figure 4 is an exploded view of the cutter base member and the lower and upper cutter blades;

Figure 5 is an enlarged side elevation of the electric drill motor with the roller and cam operated cutter mechanism in sectional view;

Figure 6 is an enlarged front view looking into

2 the electric drill motor shaft with opposed cams thereon, with the base supporting clamp secured about the forward end of the motor housing;

Figure 7 is an enlarged front elevation of a portion of the lower cutter blade with the spaced cam engaging yoke arms in position thereon;

Figure 8 is an enlarged front elevation of a portion of the upper cutter blade with the spaced cam engaging yoke arms in position thereon, and Figure 9 is an enlarged sectional view taken on the line 9—9 of Figure 2.

Like characters of reference are used throughout the following specification and the accompanying drawings to designate corresponding parts.

In carrying out the invention, there is provided a combined electrically operated power lawn mower and hedge clipper, which will be provided with a roller support 1 rotatably mounted upon the shaft or axle 2, whose opposite ends are mounted in the depending arms 3 formed integrally with the inwardly directed bearing or supporting surfaces 4 formed at the lower extremities of the handle fork member 5, which in turn is formed with a stub handle shaft 6 having an apertured ear or reduced extension 7 on its upper end.

A handle 8, preferably made from tubular material, will be forked at its lower end as at 9 and will be apertured to receive the bolt 10 and wing nut 11, said bolt 10 extending through the apertured ear 7 and the arms of the fork 9. The upper or outer end of the handle 8 will be slightly curved downwardly, and will detachably support the handle grip 12, whereby the lawn mower may be pushed with the greatest of ease.

The motive power for the combined lawn mower and hedge trimmer will comprise an electric drill motor generally denoted by the reference numeral 13, the same having a motor shaft 14 which will be externally threaded as at 15 to receive the sealed ball bearing double acting or opposed cams 16 and 17, which will operate the lower and upper cutter blades respectively. The ball bearing races 18 and 19 will be mounted about the cams 16 and 17, and will be sealed to engage the upwardly extending spaced yoke arms 20 and 21, formed respectively on the lower and upper cutter blades 22 and 23, centrally of their rear edges.

A cast aluminum base 24 will be provided with the upwardly extending split attaching collar 25 which will be positioned about the annular extension 26 on the motor 13, and will be held in fixed position thereon by means of the bolt 27.

The base 24 will also be provided with the rearwardly extending slots 28 and 29 adjacent its opposite ends, whereby the same may be secured about the bolts 30 and 31 extending upwardly from the bearing or supporting surfaces 4 on the handle fork member 5, and locked thereto by means of the wing nuts 32 and 33, when the cutter mechanism is to be operated as a lawn mower. By releasing the wing nuts 32 and 33, the cutter mechanism may be quickly detached from the roller assembly, and the handle grip 12 removed from the handle 8 and placed or screwed into either of the threaded openings 34 or 35 formed in the upper rear surface of the base 24 when the cutter mechanism is to be used for clipping hedge or for trimming foliage, one hand engaging the pistol grip on the drill motor while the other hand engages the handle grip 12.

The substantially square guide studs or lugs 36 and 37 extend upwardly from the opposite ends of the base 24 and are adapted to extend through the guide slots 38 and 39 formed respectively through the opposite ends of the lower and upper cutter blades 22 and 23. The bearing strip 40 is formed between the studs 36 and 37 and form a bearing for the reciprocating lower blade 22, while the steel bearing inserts 41 are placed between the cutter blades 22 and 23, and held in any desired manner, as for example by having their end portions in engagement with the lugs 36 and 37, to provide a slight space between the cutter blades, and to form a bearing surface for the upper cutter blade 23.

An adjustable tensioning cover member 42 is formed with an integral hood 43 which will overlie and protect the cams and their associated mechanisms, while the rear portion of the member 42 will bear on the rear edge of the base 24 and the front turned down end 44 will contact and engage the upper surface of the upper cutter blade 23 to place a variable tension thereon, by tightening down on the four screw bolts 45 extending through the cover member 42 and into threaded openings 46 in the said base 24. The opposite ends of the cover member 42 will be turned down as at 47 to protect the ends of the cutter blades from foreign matter which might get into the operating mechanism.

From the foregoing description, it will be apparent that the roller and handle comprise a unit to which the electric drill motor and cutter blades with associated mechanism are detachably secured when it is intended to use the apparatus for mowing grass, and that when it is intended to use the mechanism as a hedge clipper and foliage trimmer, it is only necessary to loosen the two wing nuts on the handle fork and place the handle grip from the handle on either side of the base member, whereupon the two hands may support the mechanism and use the same in its dual capacity.

Since the whole mechanism weighs a mere five or six pounds, it will be seen that practically no fatigue will be experienced from the operation of the same, also the cost of manufacturing and using the combined electrically operated power lawn mower and hedge clipper will be extremely low.

While the preferred embodiment of the instant invention has been illustrated and described, it will be understood that it is not intended to limit the scope of the invention thereto, as many minor changes in detail of construction may be resorted to without departure from the spirit of the invention.

Having thus described our invention, what we claim as new and desire to secure by Letters Patent of the United States is:

1. A combined electrically operated power lawn mower and hedge clipper including a handle having a forked inner end formed with depending arms and integral inwardly directed supporting surfaces, positioning bolts extending upwardly from said supporting surfaces, a roller support mounted between said depending arms, a transversely extending base having notches formed in its rear edge adjacent its opposite ends engageable with said bolts for securing said base upon said supporting surfaces, upwardly extending guide lugs on said base adjacent its opposite ends, upper and lower cutter blades formed with elongated guide slots adjacent their opposite ends disposed over said guide lugs supported for reciprocable movement upon said base, a longitudinally extending bearing strip disposed in contact with the lower surface of each of said cutter blades, upwardly extending spaced yoke arms on the rear edges of said cutter blades with the yoke arms on said upper blade being disposed forwardly of the yoke arms on said lower blade, an integrally formed attaching collar on said base, an electric motor detachably supported by said attaching collar, and double acting opposed cams supported and driven by said motor for actuating said upwardly extending spaced yoke arms on said cutter blades for driving the same.

2. The subject matter as claimed in claim 1, and sealed ball bearing races disposed about said cams engageable with the upwardly extending spaced yoke arms on said cutter blades for driving the same.

LESTER C. RENFROE.
CHARLES C. RENFROE.

REFERENCES CITED

The following references are of record in the file of this patent:

UNITED STATES PATENTS

| Number | Name | Date |
| --- | --- | --- |
| 1,357,364 | Van Bree | Nov. 2, 1920 |
| 1,411,440 | Kocourek | Apr. 4, 1922 |
| 1,644,962 | Swickard | Oct. 11, 1927 |
| 1,660,764 | Pidlisny | Feb. 28, 1928 |
| 1,814,649 | Wade | July 14, 1931 |
| 1,902,114 | Beanblossom | Mar. 21, 1933 |

FOREIGN PATENTS

| Number | Country | Date |
| --- | --- | --- |
| 652,391 | Germany | Oct. 29, 1937 |